Oct. 11, 1949.    T. S. BAUMAN    2,484,671
SILK SCREEN STENCIL DECORATING MACHINE
Filed May 2, 1944    7 Sheets-Sheet 1

Inventor
T. S. BAUMAN
By Rule and Hoge
Attorneys

Oct. 11, 1949.　　　　T. S. BAUMAN　　　　2,484,671
SILK SCREEN STENCIL DECORATING MACHINE
Filed May 2, 1944　　　　　　　　　　　　　　7 Sheets-Sheet 2

Inventor
T. S. BAUMAN
By Rule and Hoge
Attorneys

Inventor
T. S. BAUMAN
By Rule & Hoge
Attorneys

Oct. 11, 1949. T. S. BAUMAN 2,484,671
SILK SCREEN STENCIL DECORATING MACHINE
Filed May 2, 1944 7 Sheets-Sheet 4

Inventor
T. S. BAUMAN
By Rule and Hoge,
Attorneys

Oct. 11, 1949.  T. S. BAUMAN  2,484,671
SILK SCREEN STENCIL DECORATING MACHINE
Filed May 2, 1944  7 Sheets-Sheet 6

Inventor
T. S. BAUMAN
By Rule & Hoge
Attorneys

Oct. 11, 1949.  T. S. BAUMAN  2,484,671
SILK SCREEN STENCIL DECORATING MACHINE

Filed May 2, 1944  7 Sheets-Sheet 7

Inventor
T. S. BAUMAN
By Rule and Hoge
Attorneys

Patented Oct. 11, 1949

2,484,671

UNITED STATES PATENT OFFICE 2,484,671

SILK SCREEN STENCIL DECORATING MACHINE

Thomas S. Bauman, Toledo, Ohio, assignor to Owens-Illinois Glass Company, a corporation of Ohio Application May 2, 1944, Serial No. 533,761

13 Claims. (Cl. 101—124)

My invention relates to apparatus for applying surface decorations to tumblers and other articles. The invention provides a machine adapted for automatically applying permanent designs or decorative patterns in single or multiple colors by a silk screen process.

An object of the invention is to provide an improved method and mechanism by which such designs or patterns may be quickly applied and superimposed in one or more colors, by a plurality of successive applications of the decorating material without removing the workpiece, or article which is being decorated, from the machine before the cycle of operations is completed. The invention provides an apparatus for the application, through silk screens or the like, of patterns of ceramic color material and means for drying the same. The invention also provides apparatus for mechanically maintaining exact registration between the succeeding color applications or designs without removing the article, which is being decorated, from the machine for a separate drying operation.

Other features and objects of the invention will appear hereinafter.

Referring to the accompanying drawings which illustrate an automatic decorating machine embodying the principles of my invention:

Figure 1:
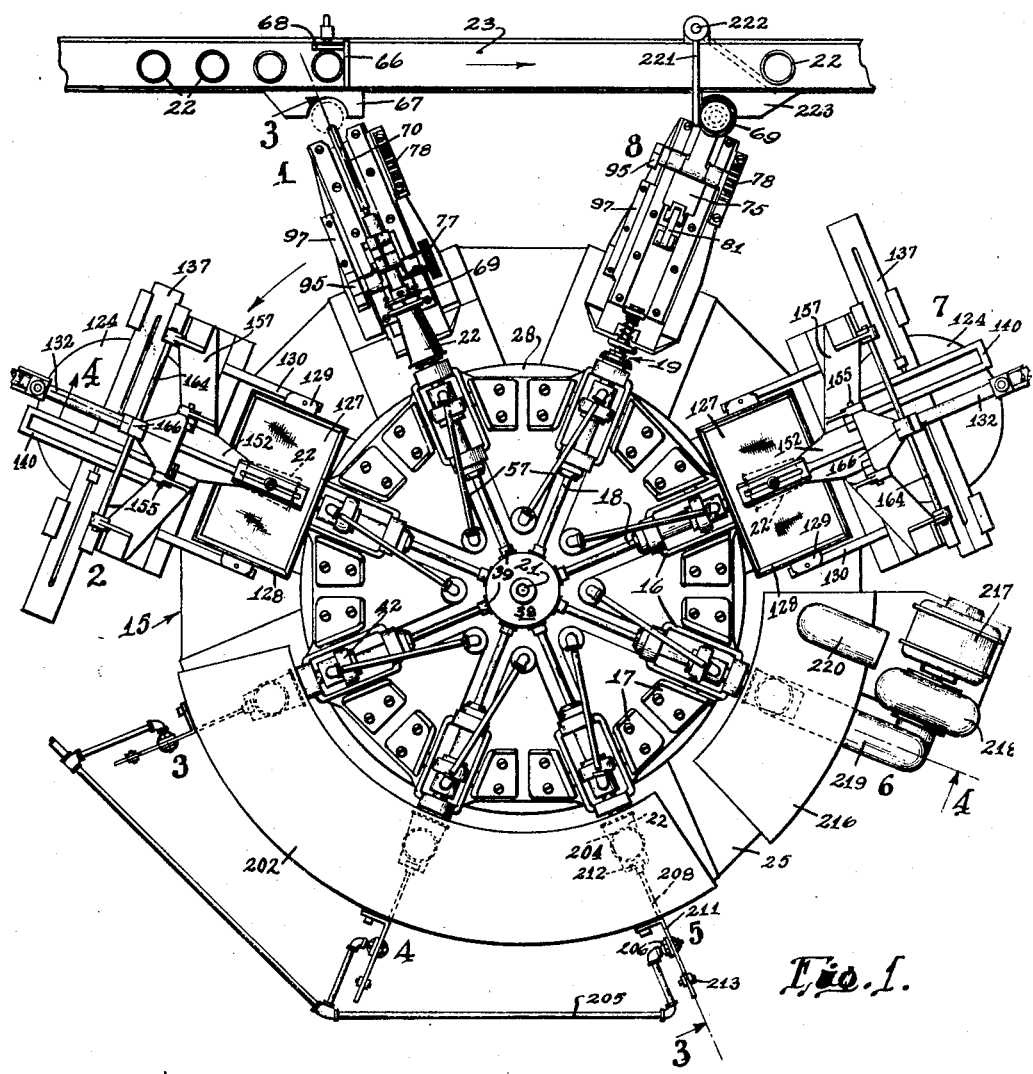
Fig. 1 is a plan view of the machine.

The machine comprises, in general terms, a carriage 15 mounted on a supporting framework for rotation about a vertical axis, an annular series of work-holder units mounted on the carriage, each unit comprising a carrier 16 (Figs. 3 and 4) with trunnions 17, a chuck spindle 18 journaled for rotation in the carrier and extending radially of the machine, and a workpiece holding chuck 19 (Figs. 5 and 8) carried on the outer end of the spindle; a continuously rotating vertical shaft 21 at the axis of the machine carriage for intermittently driving the chuck spindles 18, means for rotating the carriage intermittently, step by step, for bringing each work-holder unit to a series of stations in succession. The stations are numbered from 1 to 8 inclusive (Fig. 1) and comprise a loading station 1 at which the workpieces 22 or articles to be decorated are transferred from an endless belt conveyor 23 to a chuck 19 at said station, a decorating station 2 at which the first color decoration or pattern is applied to the workpiece, heating stations 3, 4, and 5 at which heat is applied for drying the decorating material, a cooling station 6, a second decorating station 7 with decorating apparatus similar to that at station 2, and an unloading station 8 at which the decorated ware is transferred back to the conveyor 23.

A detailed description of the machine will now be given.

The operating parts of the machine are supported on the machine base 25 carrying standards 26 (Figs. 3 and 4) to which is bolted a circular cam plate 27. The carriage 15 includes a circular table 28 above the cam plate and keyed to a vertical tubular shaft 29 through which the spindle 21 extends. The machine is driven by an electric motor 30 (Fig. 4) mounted on the machine base.

A train of gearing between the motor and the carriage driving shaft 29 for intermittently rotating the latter, comprises a worm shaft 31 connected to the motor shaft and driving a worm gear 32 on a shaft 33. A Geneva drive between the shaft 33 and the carriage includes an arm 34 keyed to the shaft 33 and carrying a roll 35 which, as the arm 34 rotates, engages the radial recesses 36 in the Geneva gear 37 keyed to the shaft 29 and thereby rotates the latter step by step. Other conventional forms of gearing may be used for intermittently rotating the carriage.

The center shaft 21 for driving the chuck spindles 18 has keyed thereto at its upper end a miter gear 38 with pinions 39 on the spindles 18 are intermittently engaged for rotating the chucks.

Figure 8:
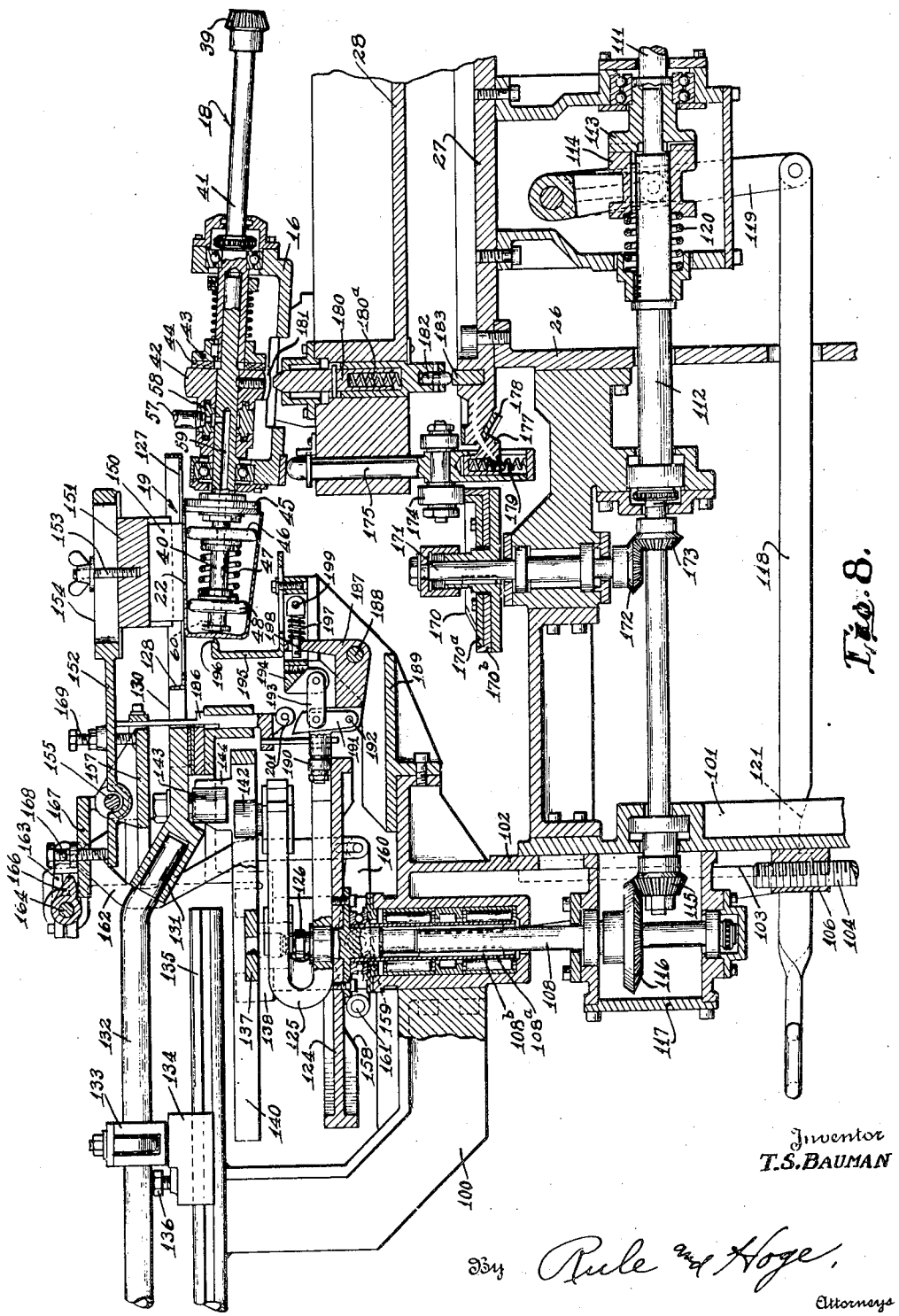
Fig. 8 is a sectional elevation of the decorating screen mechanism and associated parts.
Figure 9:
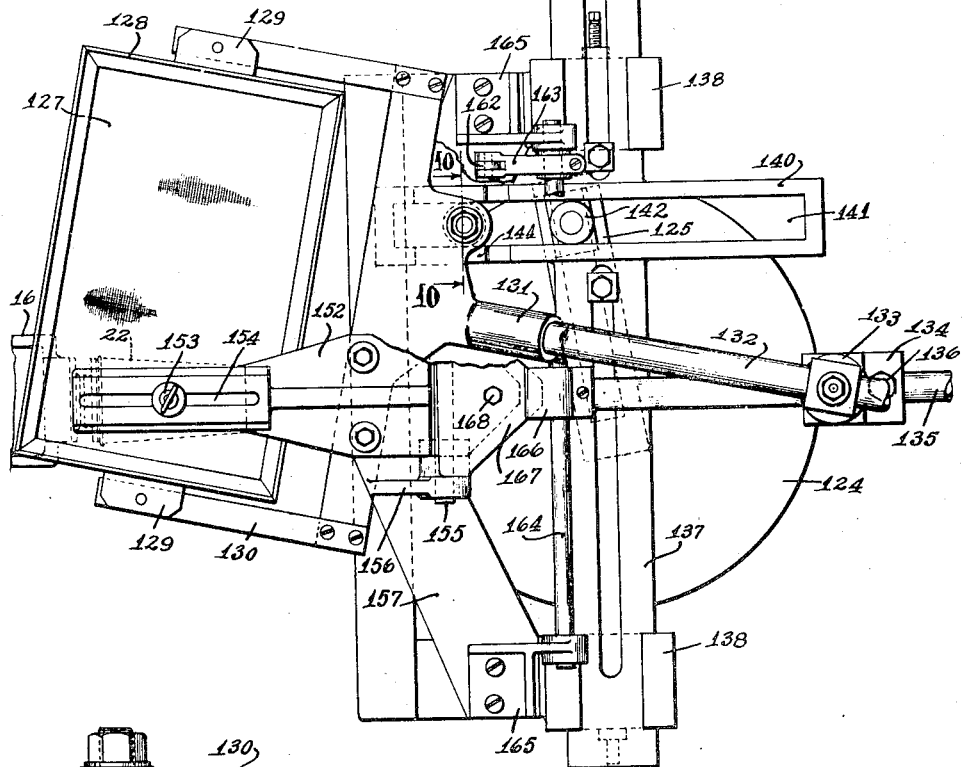
Fig. 9 is a top plan view of the decorating mechanism (with parts broken away).
Figure 12:
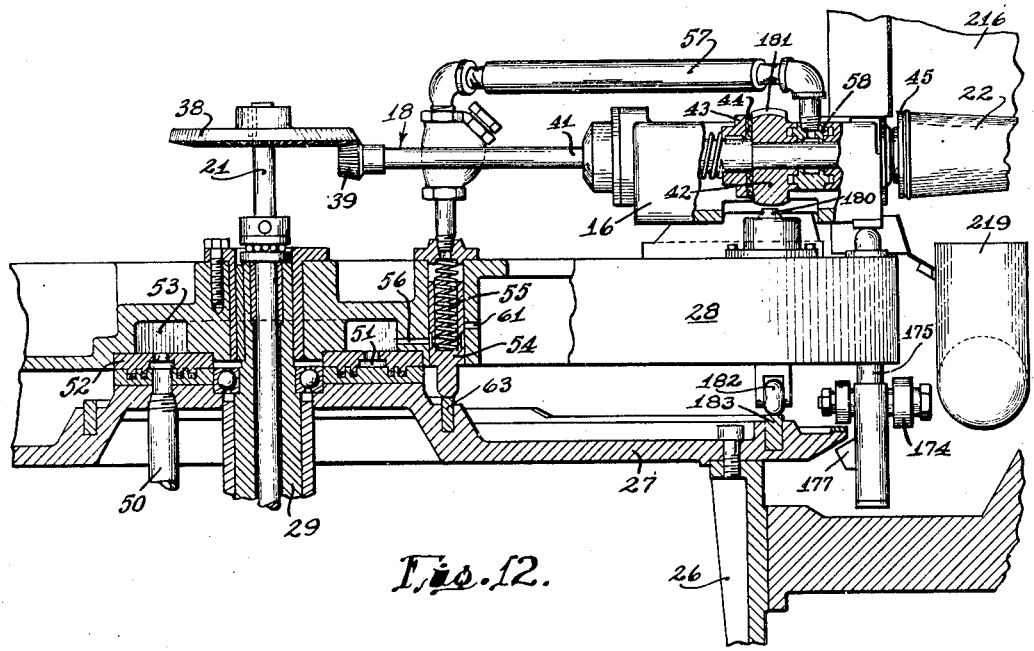
Fig. 12 is a fragmentary part-sectional elevation substantially at the line 4—4 on Fig. 1 showing suction mechanism for holding a workpiece on the chuck and also showing the cooling mechanism.

Referring to Fig. 8, each chuck spindle 18 comprises relatively rotatable driving and driven elements or shaft sections 40 and 41 having their adjoining ends telescoped. The shaft sections are connected for rotation as a unit by a friction clutch including a clutch driven member 42 and driving member 43 keyed to the shafts 40 and 41 respectively. A friction pad 44 is interposed between the clutch members. The work-holding chuck 19 includes a disk 45 fixed to the spindle and having a beveled rim to engage the rim of the tumbler 22. A second disk 46, also fixed to the spindle, provides a backing for a coil spring 47 surrounding the spindle and held under compression between the disk 46 and a disk 48 slidably mounted on the shaft for movement lengthwise thereof. The tumbler is held in position on the chuck by means of suction supplied by a vacuum system as follows:

Referring to Fig. 12, a suction pipe 50 through which the air is exhausted by any suitable suction means (not shown), opens through a port in the stationary cam plate 27 to an annular passageway 51 formed in a bearing plate 52 mounted in the table 28. The passageway 51 has port openings into a vacuum chamber 53 formed in the table 28. Tubular valves 54, individual to the spindles, are mounted for up-and-down movement in the table. Each valve is held in its lowered position by a coil compression spring 55 therein. When the valve is in its lowered position (Fig. 12) a port opening therein is in register with a duct 56 extending from the vacuum chamber 53, thereby permitting suction to be applied through the valve. The latter communicates with a suction line 57 leading therefrom to a bushing 58 (Figs. 12 and 8) on the associated spindle. The bushing is provided with an annular channel connecting the pipe 57 with a central bore 59 in the spindle shaft 40. The suction line extends through the bore 59 to a lateral port opening 60 (Fig. 5) which is normally closed by the disk 48 when the spindle is empty.

When the tumbler is placed on the spindle, it moves the disk 48 forward as shown in Fig. 8, thereby opening the port 60 so that suction is applied within the tumbler for holding the latter on the spindle. The disk 48 may be made of rubber or other suitable material for making a seal. The disk 46 may also be made of such material thereby providing a double seal for maintaining suction within the tumbler. The valve 54 (Fig. 12) controlling the application of suction to the chuck, is periodically lifted to position for closing the port 56 and opening the suction line to an exhaust port 61, thereby releasing the tumbler from the chuck at the take-off station 8. The means for lifting the valve 54 comprises a cam lobe 62 (Fig. 3) formed on a cam ring 63 mounted on the cam disk 27 and on which the valve stem runs.

The loading mechanism by which the tumblers are transferred from the conveyor 23 (Fig. 1) to the chucks 19 at the loading station 1 will now be described.

Referring to Figs. 3, and 5 to 7, such mechanism is supported on a stationary frame or bracket 65 bolted to the machine base. The tumblers as they are brought by the belt conveyor to the loading station 1 are arrested by a stop 66 (Fig. 1) and then moved by a pusher 68, over a stationary platform 67 onto a loading chuck 69. The pusher 68 may be operated automatically in synchronism with the intermittent movement of the carriage 15. The tumblers are held on the loading chuck 69 by means of suction applied through a flexible hose 70 to which is attached a pipe 71 carrying the chuck 69. The pipe 71 is clamped in the free end of a rock arm 72 keyed to a rock shaft 73. The rock shaft is journaled in bearing lugs 74 formed on a slide bar 75 which is mounted for reciprocating movement on the frame 65 in a direction radial to the machine. The slide bar is formed with guideways for stationary guide rails 76 bolted to the frame 65.

Figure 3:
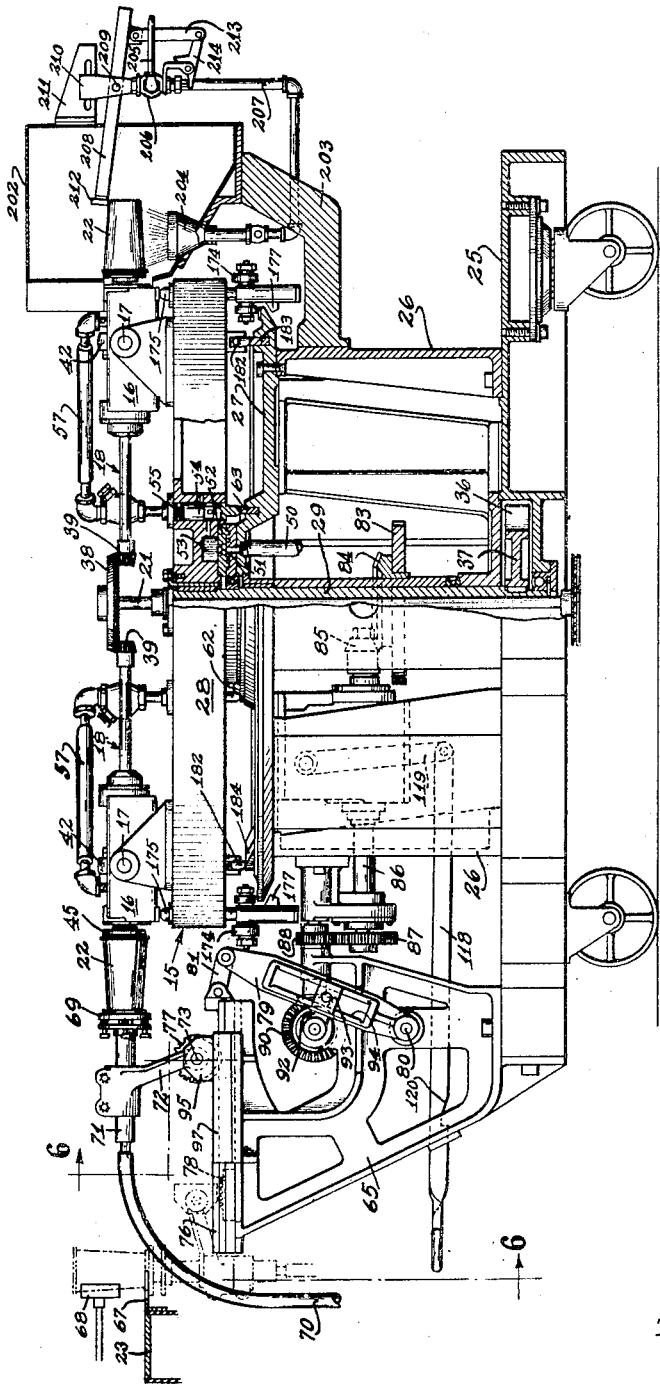
Fig. 3 is a part-sectional elevation of the machine, substantially at the line 3—3 on Fig. 1.

Keyed to the shaft 73, at one end thereof, is a gear pinion 77 which runs in mesh with rack teeth on a short stationary rack bar 78 secured to the frame 65. The slide bar 75 is reciprocated by a rock arm 79 connected at one end to a rock shaft 80 journaled in the frame 65, the rock arm being connected through a link 81 to the slide bar. The rock arm 79 is rocked by the motor 30 (Fig. 4) operating through a train of gearing including the shaft 33, a pinion 82 keyed to said shaft and driving a spur gear 83 journaled for rotation on the carriage driving shaft 29. A bevel gear 84 connected to the gear 83 drives a pinion 85 (Fig. 3) on a shaft 86 to which is keyed a spur gear 87 (Figs. 3 and 5). The gear 87 drives a pinion 88 on a shaft journaled in the frame 65 and carrying a bevel gear 89. The latter drives a gear 90 on a shaft 91 journaled in the frame 65. A crank 92 on the shaft 91 carries a connector block 93 which runs in a guideway 94 in the rock arm 79.

As shown in Fig. 5, the transfer chuck 69 is in upright position for receiving a tumbler 22 which is placed thereon by the pusher bar 68 (Fig. 3). The tumbler is held on the transfer chuck by suction applied through the pipe 70, while the article is being transferred to the chuck 19. Such transfer is effected by the rocking movement of the arm 79 inward from the Fig. 5 position to the Fig. 3 position. As the slide bar 75 commences its inward movement, the gear 77 running on the rack bar 78, rocks the shaft 73 and swings the arm 72 upward, thereby bringing the chuck carrying pipe 71 to a horizontal position in line with the chuck 19. As the gear 77 runs off the rack, the shaft 73 is held against further rotation by a guide block 95 having a straight guiding surface 96 which swings from a vertical to a horizontal position during the rotation of the shaft 73 and bears against a guide bar 97 attached to the frame 65. The chuck 69 is thus held against further swinging movement and is carried forward horizontally, and places the tumbler on the chuck 19. The transfer chuck 69 is mounted on springs 98 which permit it to yield as the tumbler is positioned on the chuck 19, and thereby cut off the vacuum through the line 70, thus releasing the tumbler to the chuck 19.

The gearing for operating the rock shaft 79 is so proportioned relative to that for intermittently rotating the carriage that a tumbler is transferred after each step rotation of the carriage. The mechanism is also so timed that the tumblers are placed on the chuck 19 while the carriage is at rest.

Each tumbler or article to be decorated, when brought to station 2 has the first decoration or color design applied thereto by the decorating unit at said station. The decorating apparatus as shown in detail in Figs. 4 and 8 to 10 will now be described. Such apparatus is carried on a stationary frame 100 which is mounted on a bracket 101 attached to the machine base. The frame 100 is adjustable up and down in the bracket and for this purpose has a depending arm 102 slidable in vertical guideways 103 in the bracket. A vertical screw-threaded adjusting rod 104 journaled in the bracket 101 has a screw-threaded connection with a bearing 106 on the arm 102, and is rotatable by a hand crank 107 for adjusting the frame 100 up and down.

Figure 4:
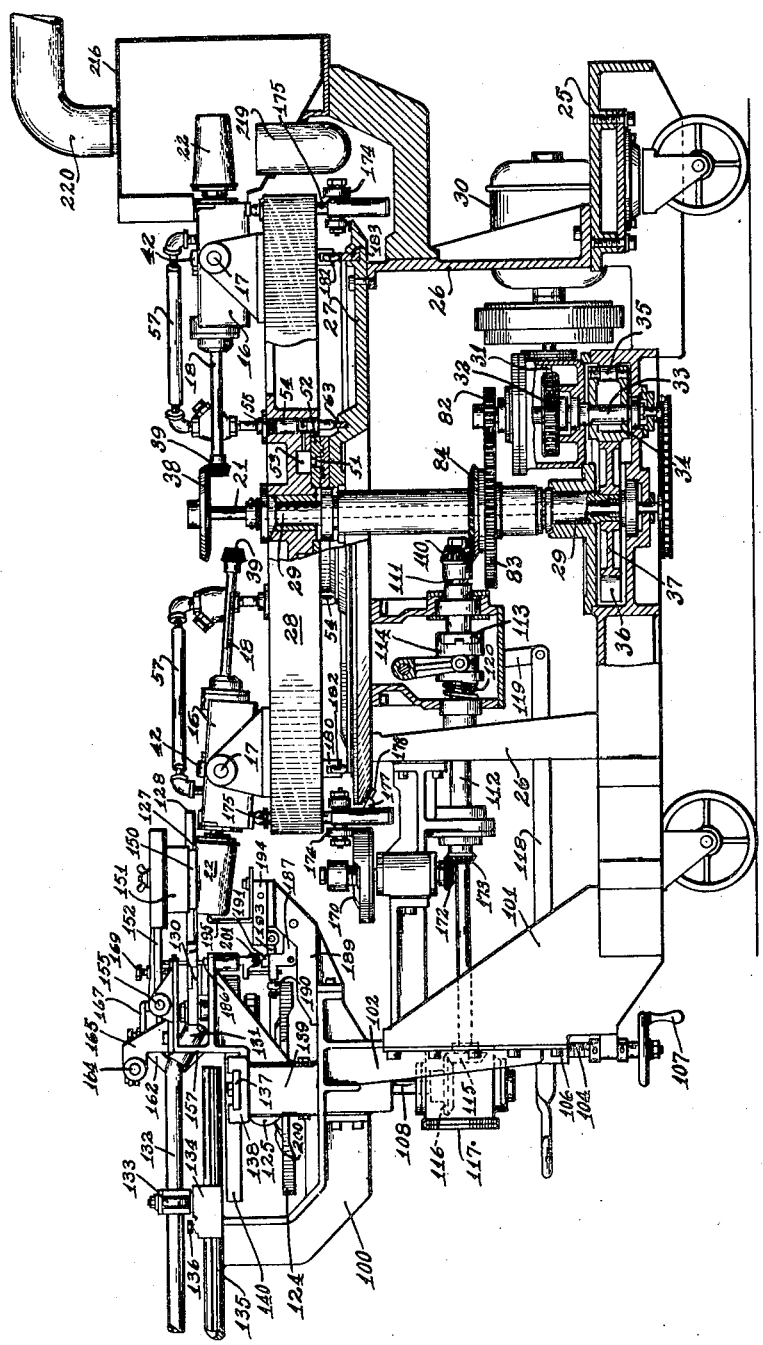
Fig. 4 is a similar view substantially at the line 4—4 on Fig. 1.
Figures 5, 6, 7:
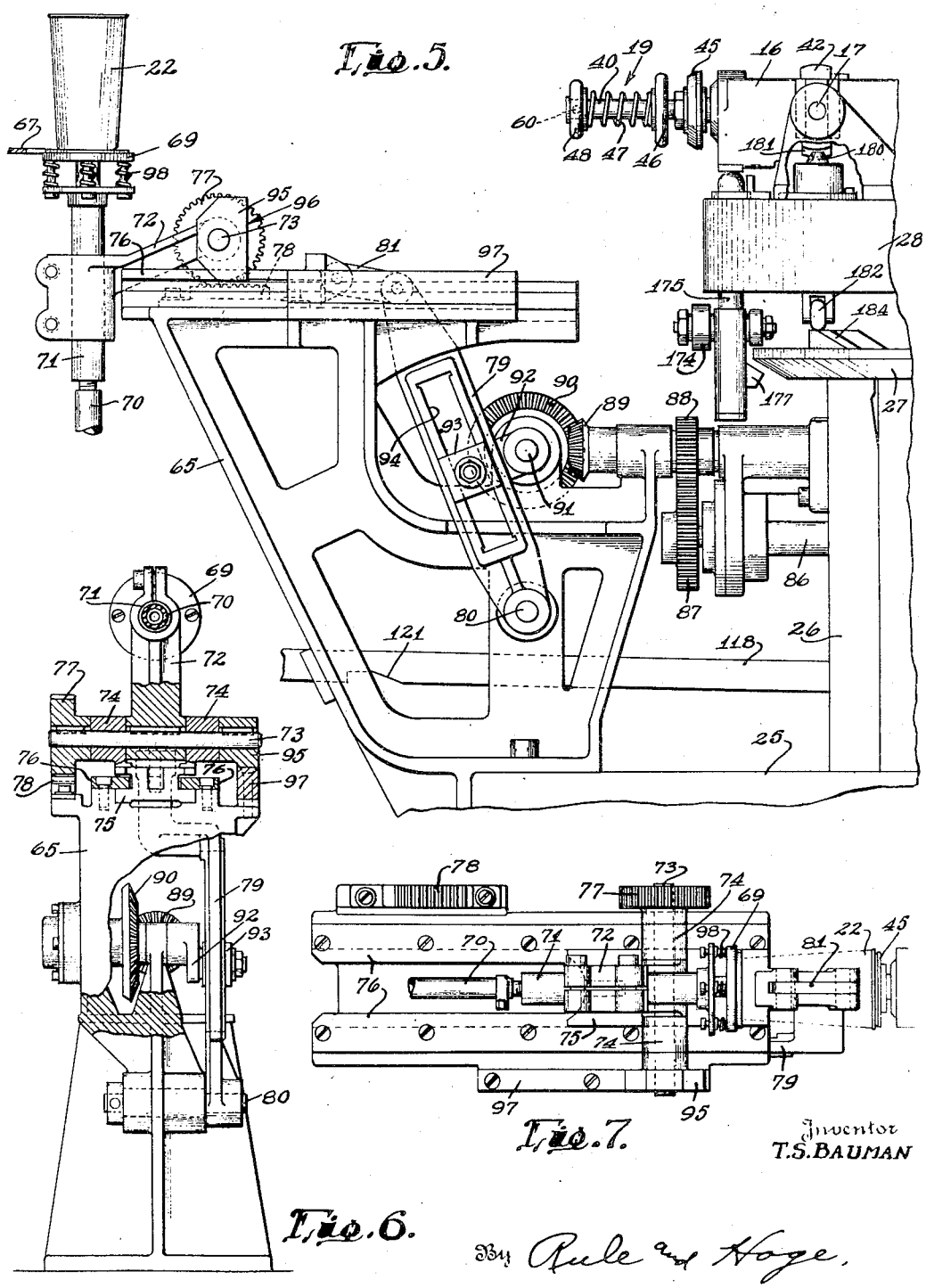
Fig. 5 is a fragmentary elevation on a larger scale of the loading mechanism for transferring articles from a conveyor to the decorating machine.
Fig. 6 is a part-sectional elevation of the loading mechanism, substantially at the line 6—6 on Fig. 3.
Fig. 7 is a plan view of the loading mechanism.

A vertical shaft 108 is journaled in a gear box 117 attached to the arm 102, and is adapted for continuous rotation by the motor 30 operating through gearing including the bevel gear 84 (Fig. 4). The gear 84 meshes with a pinion 110 keyed to a shaft 111 aligned with a shaft 112 and having a driving connection with the latter through a clutch including a clutch member 113 on the shaft 111 and a clutch member 114 splined on the shaft 112. Intermeshing bevel gears 115 and 116, journaled in a gear box 117, are attached to the shafts 112 and 108 respectively for driving the latter. The clutch 113, 114 may be opened by means of a hand-operated rod 118 connected to a rock arm 119 having an operating connection with the clutch member 114. The clutch may be held open against the compressive force of the clutch closing spring 120 by means of a hook 121 on the rod 118 (Figs. 5 and 8).

A tubular shaft 108ᵃ (Figs. 8 and 10) telescopes with the shaft 108 and is driven thereby through splines 108ᵇ. Keyed to the shaft 108ᵃ is a stub shaft 122 (Fig. 10) formed with a flange 123 which provides a support for a cam disk 124 bolted to the flange. A U-shaped crank or driving member 125 is clamped to the shaft 122 and cam disk by means of a clamping nut 126 threaded on the upper end of the shaft 122. The driver 125 operates to reciprocate the decorating screen frame as will presently appear. The decorating screen 127 is mounted in a rectangular screen frame 128 which is attached by means of lugs 129 to a carrier frame 130. The latter is carried by a horizontal arm 132 to which it is attached by means of a shank 131. A clamp 133 in which the rod 132 is adjustable lengthwise, has a swivel connection with a block 134 slidably mounted for adjustment on a bar 135 formed on the frame 100 and extending radially of the machine carriage. A set screw 136 holds the block 134 in adjusted position.

Operating connections between the driving arm 125 and the screen carrier frame 130, include a slide bar 137 mounted to reciprocate lengthwise in stationary guides 138 at the upper ends of standards 139 (Fig. 4) on the frame 100. The slide bar 137 is formed intermediate its end with an integral cross arm 140 in the form of a narrow rectangular frame having its sides spaced to form a guideway 141 in which runs a driving roll 142 on the driver 125. The slide bar 137 is positioned directly over the drive shaft 108. A driving connection between the screen carrier frame 130 and the slide 137 comprises a roll 143 journaled on the underside of the carrier frame and extending downward between a pair of lugs 144 formed on the cross arm 140. Rotation of the driving member 125 operates to reciprocate the slide 137 and cause the cross arm 140 to oscillate the screen carrier about the axis of the swiveled block 133.

Figure 10:
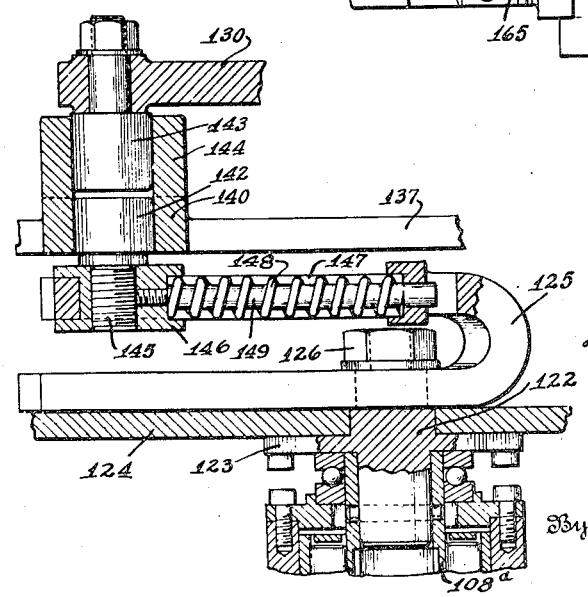
Fig. 10 is a fragmentary sectional elevation showing a portion of the mechanism for reciprocating the decorating screen.

As shown in Fig. 10, the roll 142 is mounted on a stub shaft 145 attached to a slide block 146 which is slidably mounted in the driver 125 for movement lengthwise thereof in a guideway 147 formed in the driver. The block 146 is yieldably held in the outer end of the arm by a coil compression spring 148 mounted on a guide rod 149 attached to said block. This construction permits a limited movement of the connector block 146 lengthwise of the driver as may be necessary when the slide bar 137 is arrested at the limits of its reciprocating movements.

The squeegee 150 made of rubber or the like, is adapted to wipe across the screen 127 as the latter reciprocates for transfering the design or pattern to the workpiece in a conventional manner. The squeegee is mounted in a clamping block 151 carried on a squeegee arm 152. The squeegee is adjustable lengthwise of the arm and is clamped in position by a wing nut on a screw-threaded clamping bolt 153 attached to the block and extending through a slot 154 in the squeegee arm 152. The latter is mounted to rock about the axis of a pivot shaft 155 supported in bearing lugs 156 formed on a frame 157 mounted on the main frame 100.

Means for rocking the squeegee arm 152 includes the cam 158 (Fig. 8) formed on the lower surface of the cam disk 124. A cam follower roll 159 running on the cam is carried on a rock arm 160 which swings on a pivot pin 161. The arm 160 is connected through a vertically-disposed connecting rod 162 to a rock arm 163 attached to a rock shaft 164. The latter is journaled in brackets 165 (Fig. 9) on the frame 157. Clamped to the rock shaft 164 is a tappet 166 which overhangs an arm 167 pivoted on the shaft 155. A stop screw 168 adjustable in the arm 167, is positioned over the outer end of the squeegee arm 152.

When the cam 158 engages the roll 159, it operates through the lever 160 and link 162 to rock the shaft 164, so that the tappet 166 swings the arm 167 downward and thereby swings the squeegee arm about its pivot and thus lifts the squeegee off the screen. When the cam runs off the roll, the squeegee is lowered by gravity onto the screen. An adjustable stop screw 169 mounted in the arm 152 bears against the frame 157 and limits the downward movement of the squeegee.

The workpiece is held in contact with the decorating screen by mechanism including a cam 170 mounted on a shaft 171 journaled in the machine frame and carrying a bevel gear 172 running in mesh with a gear 173 on the shaft 112. The cam as shown comprises a pair of cam disks 170ᵃ and 170ᵇ which are separately rotatable for adjustment, thereby permitting adjustment of both the effective length and rotative position of the cam. A cam follower roll 174 running on the cam is carried by a vertical rod 175 mounted for up-and-down movement in the table 28 and positioned directly beneath the chuck carrier 16. The cam operates through said rod to swing the carrier and spindle to the inclined position (Fig. 8), thereby holding the workpiece in contact with the screen and holding the pinion 39 out of contact with its driving gear 38 (Fig. 4). The chuck with the workpiece thereon is thus free to rotate and permit the workpiece to roll along the screen during the decorating operation.

The carriage is accurately held in its indexed position by means of a holding lug 177 (Fig. 8) mounted for up-and-down movement in the rod 175 and yieldingly held by a spring 179 in engagement with a notched plate 178 on the stationary cam plate 27.

As the machine is designed for applying a plurality of color designs in succession at different decorating stations, there is provided orienting means for bringing the work-holding chuck to a predetermined rotative position at each decorating station prior to the decorating operation, so that the designs will be accurately superimposed or placed relative to each other. Such means includes a registering pin 180 or spindle-holding rod (Fig. 8) mounted in the table 28 for up-and-down movement. The tip of said rod is adapted to enter a recess 181 formed in the periphery of the clutch member 42.

The registering pin 180 carries a cam follower roll 182 which runs on a cam track 183 on the cam plate 27. The track is formed with a lifting or operative cam section 184 (Fig. 3) positioned to lift the pin 180 into engagement with the clutch member 42 while the spindle carrying the workpiece approaches the decorating station. The pin 180 comprises telescoping sections housing a coil spring 180ª which holds the pin yieldingly in contact with the clutch member. As the spindle 18 is rotating, the pin 180 rides on the periphery of the clutch member until it engages the notch 181 and thereby arrests the work-holding chuck in a predetermined rotative position. The chuck is in such rotative position when the rod 175 is moved upward by its cam, and tilts the chuck spindle. This tilting movement of the chuck spindle first disconnects the pinion 39 from its driver and then releases the pin 180 as the workpiece moves into engagement with the screen. The rotative position of the workpiece is thus accurately determined prior to the decorating operation. When the workpiece is later brought to the second decorating station 7, it is again brought to the same rotative position determined by a registering pin 180 at said second station.

A safety device for holding the squeegee away from the screen in the event of an empty chuck being brought to a decorating station, comprises the following mechanism.

Referring to Fig. 8, a lifting rod 186 is slidably mounted in the frame 157 for up-and-down movement. A bell crank lever 187 is pivoted at 188 to a bracket 189 attached to the frame 100. One arm of the bell crank carries a roll 190 which runs on the cam disk 124. A vertically-disposed rock arm 191 is connected by a pivot 192 to the bell crank and is connected through a link 193 to a slide bar 194 which rests on the bracket 189 and is slidable horizontally thereon. Adjustably attached to the slide bar is an arm 195 extending upwardly from the slide bar and formed at its upper end with a contact finger 196 in line with the chuck and adapted to engage a workpiece thereon. The bell crank includes an arm extending upwardly through a slot in the slide bar 194 and bearing against a light coil spring 197 mounted on a rod 198 connected by a pivot pin 199 to the slide bar 194. The operation of this safety device is as follows:

When a workpiece is supported on the chuck and held in contact with the screen, the parts are in the position shown in Fig. 8. As the cam disk 124 rotates, a cam 200 therein (Fig. 4) runs under the roll 190 and swings the bell crank 187 about its pivot. This lifts the arm 191, causing the upper inclined end thereof to strike a roll 201 carried on the lower end of the lifting rod 186. This contact with the roll is at the left of the pivot thereof so that the arm 191 in its continued upward movement rides up the roll at the left side thereof, the arm at the same time swinging to the left about its pivot and through the link 193, moving the slide 194 to the left and compressing the coil spring 197. During this movement the weight of the squeegee frame prevents the roll 201 from being moved upward by the arm 191.

If, when the follower roll 190 is lifted by its cam, there is no tumbler or other workpiece on the chuck, then the movement of the bell crank 187 about its pivot 188 operates to move the slide 194 a short distance to the right as the contact finger 196 is now free for such movement. As a result, the arm 191 remains substantially vertical or is swung a slight distance to the right as it is lifted by the bell crank, and thereby engages the roll 201 and lifts the pusher rod 186. Said rod in turn lifts the squeegee, holding it out of contact with the screen as the latter is operated.

Figure 11:
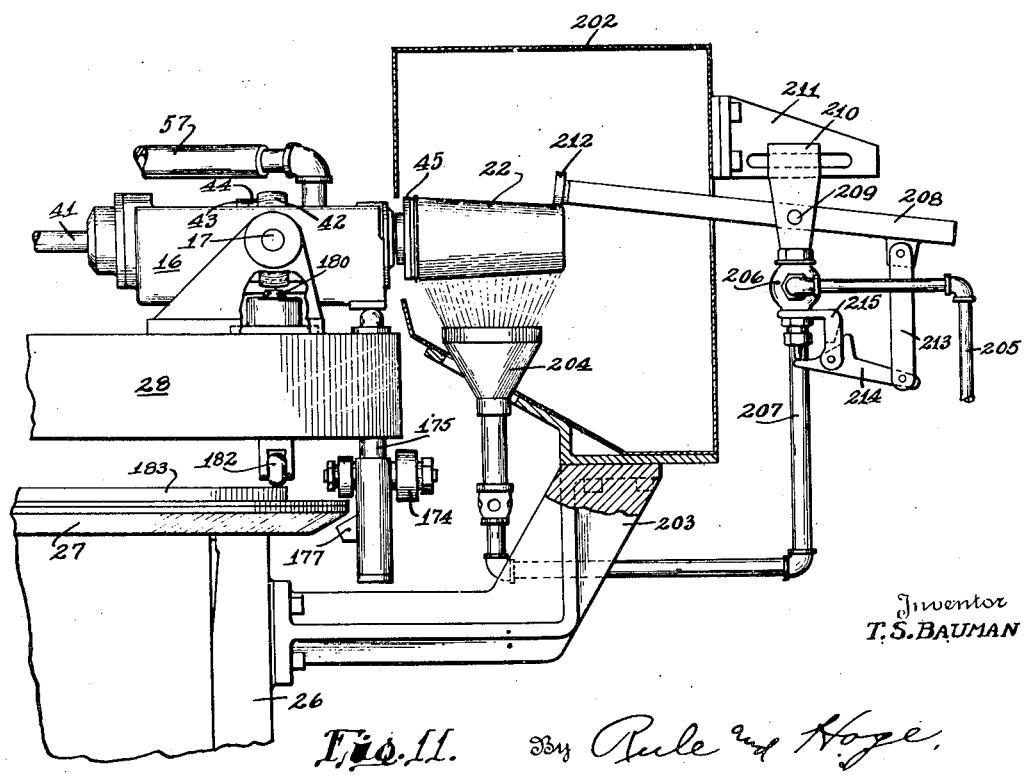
Fig. 11 is a fragmentary part-sectional elevation showing the flash mechanism for drying the applied decorating material.

After the decorating operation at station 2, the workpiece is subjected to a flashing or drying operation at one or more stations, such operation taking place within a drying oven 202 (Figs. 1 and 11), mounted on brackets 203 on the machine frame. This oven as shown, is arc-shaped and of a length to embrace the stations 3, 4, and 5. Flashing mechanism such as shown in Fig. 11 is provided at each of these stations. The mechanism comprises a burner 204 positioned to direct a flame upwardly against the rotating workpiece 22, the flame being flared or fanned outwardly to impinge against the full length of the workpiece.

Fuel gas is supplied through a pipe 205 to a valve 206 from which a pipe line 207 extends to the burner. The valve is automatically opened when the workpiece is brought to position above the burner, by mechanism including a lever 208 fulcrumed at 209 on a hanger 210 adjustably supported in a bracket 211 on the oven. The lever 208 carries a roll 212 in position to be lifted by the workpiece as the latter moves into position over the burner. A link 213 connects the lever 208 with a dog 214 pivoted to an arm 215, said dog having a nose projecting beneath the valve stem. When the lever 208 is engaged by the workpiece, it operates to open the valve and supply fuel gas to the burner. As the workpiece is rotating at this time, the flame is caused to impinge on the entire decorated surface. When the workpiece advances beyond the burner, the valve is automatically closed, the lever 208 being swung by gravity to valve closing position. This flashing or drying operation is repeated at each of the stations 3, 4, and 5.

As the workpiece advances from the drying oven to the cooling station 6, it enters a cooling chamber 216 (Figs. 1 and 12). An electric motor 217 mounted at said station drives a blower 218 which blows cooling air through a conduit 219 into the cooling chamber and directs the air against the rotating workpiece, thereby quickly cooling it. The air is exhausted from the cooling chamber through a pipe 220.

After the cooling operation, the carriage is indexed to bring the workpiece to a second decorating apparatus at station 7; such apparatus being of the same construction as that at station 2 and operating in like manner. When the workpiece leaves station 7, it is advanced to the unloading mechanism at station 8 and transferred back onto the conveyor 23. The unloading mechanism is substantially a duplicate of the loading mechanism hereinbefore described and illustrated in Figs. 5 to 7, and operates in substantially the same way except that the transfer chuck carries the workpiece from the decorating machine to the conveyor. The workpiece is moved from the transfer chuck onto the conveyor by a transfer arm 221 which is pivoted at 222 on the conveyor frame and operates to sweep the workpiece 22 from the chuck across a platform 223 onto the conveyor.

Figure 2:
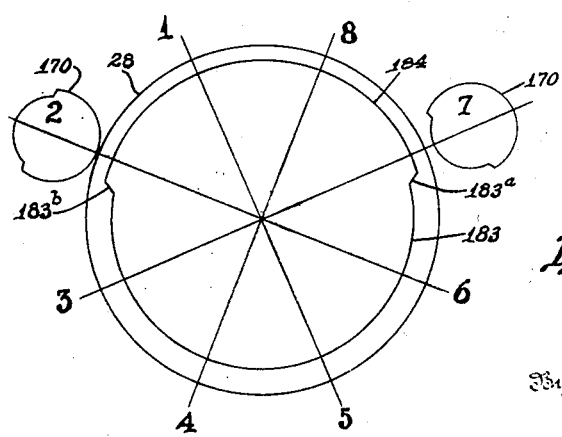
Fig. 2 is a diagrammatic view illustrating the sequence of operations.

Fig. 2 illustrates diagrammatically the cams which control the intermittent rotations of the spindles 18. The operative portion 184 of the cam track 183 as shown, extends from the point 183ᵃ to the point 183ᵇ, indicating the arc of travel of the carriage during which the registering pin is in its projected or operative position. At the time an article is being placed on a spindle at loading station 1, the spindle is held against rotation by its registering pin 180 (Fig. 5). The spindle remains locked until it reaches the decorating station 2 and the carriage is brought to rest. The cam 170 (Figs. 2 and 8) then operates, while the carriage is at rest, to tilt the spindle 18 as heretofore described, releasing it for the decorating operation. After the spindle with the workpiece thereon, advances from station 2, the registering pin is withdrawn at the point 183ᵇ, allowing the spindle to swing to horizontal position so that it is rotated through the pinion 39. The rotation of the spindle is continued while it travels through the drying oven, including stations 3, 4, and 5, and the cooling chamber at station 6. Shortly before the second decorating unit is reached at station 7, the registering pin is again projected at point 183ᵃ and operates to lock the spindle in its registered position of rotation. The cam 170 at station 7 then operates to tilt the spindle for the second decorating operation. The high portion 184 of the cam track as indicated, will then effect the locking of the spindle and hold it locked until decorating station 2 has again been reached. It will be understood, however, that the particular portions of the spindle travel, during which it is rotated, may be substantially varied, as rotation of the spindle on the axis is essential only during the drying and cooling operations.

Modifications may be resorted to within the spirit and scope of my invention.

I claim:

1. A decorating machine comprising a carriage rotatable about a vertical axis, a work-holding unit mounted on the carriage for rotation therewith, said unit comprising a spindle extending radially of the carriage and a workpiece holding chuck on the spindle, means for rotating the carriage, a decorating unit having a stationary mounting and comprising a decorating screen, a driving gear, means for rotating it on said vertical axis, a pinion on said spindle meshing with said driving gear and driven thereby for rotating the chuck about its axis and bringing it to a predetermined rotative position for cooperation with the screen, and automatic means for disengaging said pinion from the driving gear and thereby releasing the chuck from its driving means when in said rotative position and thereby permitting the workpiece on the chuck to roll in contact with the screen.

2. A decorating machine comprising a carriage rotatable about a vertical axis, a work-holding unit mounted on the carriage for rotation therewith, said unit comprising a spindle extending radially of the carriage and a workpiece holding chuck on the spindle, means for rotating the carriage, a decorating unit having a stationary mounting and comprising a decorating screen, a driving gear, means for rotating it on said vertical axis, a pinion on said spindle meshing with said driving gear and driven thereby for rotating the chuck about its axis and bringing it to a predetermined rotative position for cooperation with the screen, automatic means for disengaging said pinion from the driving gear and thereby releasing the chuck from its driving means when in said rotative position and thereby permitting the workpiece on the chuck to roll in contact with the screen, a second decorating unit at a station beyond said first mentioned decorating unit and comprising a decorating screen, and orienting means by which the chuck is again brought to a predetermined rotative position and released to the second decorating screen, whereby a second decorating design is applied in a predetermined position relative to the first design.

3. Decorating mechanism comprising a decorating screen, a workpiece holder comprising a spindle including a driving element and a driven element, means for rotating said driving element, a chuck carried by said driven element, a friction clutch comprising clutch members connected respectively to the said driving element and driven element, a holding pin movable into holding engagement with the said driven element, means cooperating with said pin for holding the spindle at a predetermined rotative position, and means for releasing said driving element from its rotating means and for releasing the chuck from said holding pin, thereby permitting the workpiece on the chuck to roll in contact with the screen.

4. Decorating apparatus comprising a carriage mounted for rotation about a vertical axis, means for rotating the carriage, a decorating screen, a holder on the carriage including a spindle extending radially of the carriage and comprising a driving element and a driven element, a work-holding chuck on the driven element, a friction clutch including clutch members on said elements respectively, a gear mounted to rotate about the axis of the carriage, means for driving said gear, a pinion on said driving element and running in mesh with said gear for rotating the spindle, a holding device having a stationary mounting and movable into position to arrest the said driven element with the latter in a predetermined rotative position, and means for tilting the said workholder and thereby disconnecting said pinion from its driving gear and stopping the rotation of the chuck and releasing the spindle from said holding device, whereby the work-piece is free to roll in contact with the screen, said screen being positioned to contact with the workpiece when the holder is tilted.

5. Decorating apparatus comprising a carriage rotatable about a vertical axis, means for intermittently rotating the carriage, a decorating screen mounted separately from the carriage, a work-holding unit mounted on the carriage including a spindle extending radially of the carriage, a workpiece holding chuck on said spindle, means for rotating the spindle about its axis, a registering device mounted on the carriage and movable into position to arrest and hold the spindle in a predetermined rotative position, a stationary cam positioned and arranged to move said registering device into said holding position, and means for swinging the work-holder into position to release it from said registering device and bring the workpiece into engagement with said screen.

6. The combination of a carriage rotatable about a vertical axis, means for rotating the carriage, a work-holding unit mounted on the carriage to rotate therewith and comprising a spindle extending radially of the carriage, a chuck on said spindle for holding a workpiece, means for revolving the spindle about its axis, a stop device on the carriage, a stationary cam cooperating with said stop device and operable to move the latter to an operative position, means cooperating with said stop device to arrest the spindle in a predetermined position of revolution, a decorating screen, a second cam, and means actuated by said second cam to tilt the spindle and disengage it from said stop device and bring the workpiece into contact with the decorating screen.

7. A decorating unit comprising a screen, a carrier therefor mounted for horizontal oscillation, a squeegee carrier, a vertical shaft, means for rotating it, a driver on the shaft, means providing operating connections between said driver and the screen carrier for oscillating the latter, a stationary cam, a cam follower roll running thereon, means providing a driving connection between said shaft and roll for driving the said roll, and means providing driving connections between said roll and the squeegee carrier for lifting and lowering the squeegee.

8. A decorating unit comprising a screen, a carrier therefor mounted for horizontal oscillation, a squeegee carrier, a vertical shaft, means for rotating it, a driver on the shaft, means providing operating connections between said driver and the screen carrier for oscillating the latter, a stationary cam, a cam follower roll running thereon, means providing a driving connection between said shaft and roll for driving the said roll, means providing driving connections between said roll and the squeegee carrier for lifting the squeegee and holding it in lifted position while the screen is moving idly in one direction and releasing the squeegee for wiping contact with the screen as the latter moves in the opposite direction, an article-holding chuck cooperating with the screen, and safety means for holding the squeegee in its lifted position out of wiping contact with the screen and including means operable to prevent said lifting and holding of the squeegee out of wiping contact with the screen while the workpiece is on said holder.

9. A decorating mechanism comprising a decorating screen, a carrier therefor mounted for horizontal reciprocation, a squeegee carrier, a squeegee attached thereto and positioned over the screen, a vertical drive shaft, means for rotating the shaft, a driving crank connected to the shaft, means providing driving connections between said crank and screen carrier, a cam disk connected to rotate with said shaft, a cam track on said disk, a cam follower roll running on said track, and means providing operating connections between said roll and squeegee carrier for tilting the latter and thereby lifting the squeegee from the screen.

10. A decorating mechanism comprising a decorating screen, a carrier therefor mounted for horizontal reciprocation, a squeegee carrier, a squeegee attached thereto and positioned over the screen, a vertical drive shaft, means for rotating the shaft, a driving crank connected to the shaft, means providing driving connections between said crank and screen carrier, a cam disk connected to rotate with said shaft, a cam track on said disk, a cam follower roll running on said track, means providing operating connections between said roll and squeegee carrier for tilting the latter and thereby lifting the squeegee from the screen, said cam being positioned and arranged to hold the squeegee off the screen during the movement of the screen carrier in one direction and releasing the squeegee for wiping contact with the screen while the latter moves in the other direction, a work-holder for holding an article to be decorated, a device for holding the squeegee carrier and squeegee out of contact with the screen independently of said cam, and means operable by a workpiece on the holder for rendering said holding device inoperative.

11. A decorating mechanism comprising a decorating screen, a carrier therefor mounted for horizontal reciprocation, a squeegee carrier, a squeegee attached thereto and positioned over the screen, a vertical drive shaft, means for rotating the shaft, a driving crank connected to the shaft, means providing driving connections between said crank and screen carrier, a cam disk connected to rotate with said shaft, a cam track on said disk, a cam follower roll running on said track, means providing operating connections between said roll and squeegee carrier for tilting the latter and thereby lifting the squeegee from the screen, said cam being positioned and arranged to hold the squeegee off the screen during the movement of the screen carrier in one direction and releasing the squeegee for wiping contact with the screen while the latter moves in the other direction, a work-holder for holding an article to be decorated, a safety device for holding the squeegee in lifted position, said safety device comprising a cam on said cam disk, a lifting device actuated by said cam for lifting the squeegee and holding it in lifted position, and means operable by a workpiece on the holder for breaking the operating connections between said lifting device and its cam.

12. Decorating mechanism comprising a screen, a workpiece holding chuck, a spindle comprising a driving element and a driven element on which the chuck is mounted, a driving gear, means for rotating said gear, a pinion on said driving element, means for mounting said spindle for tilting movement into and out of a position in which the pinion meshes with said driving gear, a friction clutch providing driving connection between said elements, automatic means cooperating with the clutch for arresting the chuck at a predetermined rotative position, and means for then tilting the spindle and thereby bringing the workpiece into contact with the decorating screen and by said tilting movement of the spindle first disengaging said gear and pinion while the chuck is held in said arrested position and thereafter releasing the chuck from said arresting means, thereby leaving the chuck and workpiece free for rotation while the workpiece is in rolling contact with the decorating screen.

13. A decorating machine comprising a carriage rotatable about a vertical axis, a workholding unit mounted on the carriage for rotation therewith, said unit comprising a spindle extending radially of the carriage and a workpiece holding chuck on the spindle, means for rotating the carriage, a decorating unit having a stationary mounting and comprising a decorating screen, a driving gear mounted for rotation on the axis of the carriage, a pinion fixed on said spindle and running in mesh with said gear, said spindle being mounted for tilting movement into position to release the pinion from said driving gear, and automatic means for tilting said spindle and thereby bringing the workpiece into contact with the decorating screen.

THOMAS S. BAUMAN.

REFERENCES CITED

The following references are of record in the file of this patent:

UNITED STATES PATENTS

| Number | Name | Date |
|---|---|---|
| 705,084 | Hormby | July 22, 1902 |
| 1,724,645 | Long | Aug. 13, 1929 |
| 2,085,126 | Shurley | June 29, 1937 |
| 2,105,572 | Williams | Jan. 18, 1938 |
| 2,132,818 | Cone | Oct. 11, 1938 |
| 2,157,388 | MacArthur | May 9, 1939 |
| 2,157,638 | Soubier | May 9, 1939 |
| 2,183,223 | Mankin | Dec. 12, 1939 |
| 2,198,565 | Schutz | Apr. 23, 1940 |
| 2,207,179 | Schreiber | July 9, 1940 |
| 2,207,351 | McLaughlin | July 9, 1940 |
| 2,217,133 | Overlach | Oct. 8, 1940 |
| 2,231,535 | Jackson | Feb. 11, 1941 |
| 2,261,255 | Jackson | Nov. 4, 1941 |
| 2,359,825 | Campbell | Oct. 10, 1944 |